United States Patent Office 2,782,497
Patented Feb. 26, 1957

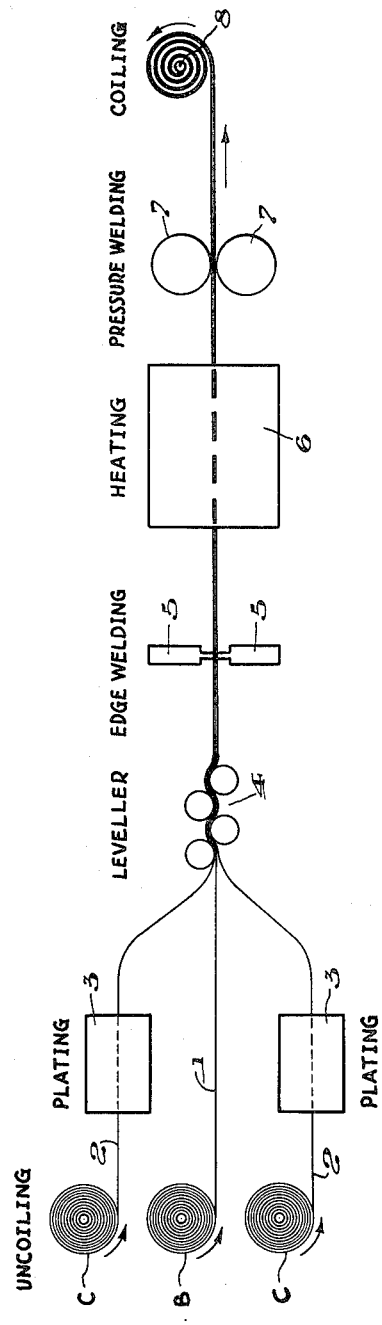

2,782,497
METHOD OF MAKING CLAD STEEL

John M. Campbell, Washington, Pa., assignor to Composite Steels, Inc., Washington, Pa., a corporation of Pennsylvania Application September 28, 1955, Serial No. 537,141

2 Claims. (Cl. 29—471.5)

This invention relates to clad metal, and more particularly to a method of making it continuously in any desired length.

The general way of making clad metal is to clamp or weld together the edges of two or three plates or slabs of metal that are disposed face to face, heat the composite unit and then subject it to pressure sufficient to cause its components to weld together throughout their areas. Later, the composite unit is reheated and rolled out into a sheet or strip of the desired thickness.

It is among the objects of this invention to provide a method of making clad metal, in which composite strips of infinite length can be formed continuously, in which the clad metal is made from previously rolled strip, and in which all steps are performed automatically.

According to the invention, a strip of base metal and at least one strip of cladding metal are fed from coils continuously and simultaneously in the same direction in superimposed relation. The side of the traveling cladding strip next to the base strip preferably is plated with a metal that can easily be pressure welded to the base strip. The strips then are brought together and their edges are welded together to form a composite strip. The composite strip is then heated to a pressure welding temperature, immediately following which it is placed under sufficient pressure to weld its component strips together throughout their width.

The preferred embodiment of the invention is illustrated in the accompanying drawing, which is a diagrammatic view of my method.

Referring to the drawing, three coils of metal strip are shown rotatably mounted one above another so that strip can be unwound continuously from all three and fed in the same direction. The strip 1 from the center coil B is the base strip which is to be clad by the strips 2 from the upper and lower coils C. The base strip may be carbon steel, for example, and the cladding metal strips stainless steel. The three strips are led away from the coils in spaced apart relation, and the top and bottom strips then preferably pass through electroplating units 3 where their inner surfaces are plated with a metal that is amenable to pressure welding later in the process. Thus, it is desirable to plate the inner surfaces of stainless steel cladding strips with iron, which will fuse with a carbon steel strip when pressed against it under heat and pressure.

From the plating units the cladding strips 2 are led into engagement with the opposite sides of the center strip, preferably at the entrance to a flattening device 4 which flattens out the strips so that they will lie flat against one another. The flattening device may be a roller leveler. From this device the three engaging strips pass between edge welders 5 of any suitable construction, by which their edges are welded together, either in continuous seams or in spots. Some types of welders can be used without previously flattening the strips, as the welders themselves will hold the strips together well enough for edge welding.

The next step in the method is to lead the composite strip through a furnace 6, where it is heated to a temperature that will permit the component strips to be welded together when a predetermined pressure is applied to them. This pressure may be applied by a pair of rolls 7 immediately after the strip leaves the furnace. As it passes between the rolls, the top and bottom strips are fused to the middle strip throughout their width, thereby producing a clad strip which is wound on a driven tension reel 8 by which the strips are pulled through all of the apparatus just described. The coil of composite or clad strip can be processed further as desired, such as in a cold rolling mill.

With this method of making clad metal the yield is very high, being better than 90%. Once the strips are started through the process, there is no loss except the customary edge trimming. The strips will be welded together from edge to edge and continuously throughout their length.

According to the provisions of the patent statutes I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A continuous method of making clad metal, comprising continuously uncoiling a coil of carbon steel strip and a coil of stainless steel strip and feeding those strips in the same direction in superimposed spaced relation, plating the side of the traveling stainless steel strip next to the other strip with a pressure weldable material, then bringing the traveling strips together and welding their edges together to form a composite strip, heating the composite strip to a pressure welding temperature, and rolling the composite strip under sufficient pressure to weld its component strips together throughout their width.

2. A continuous method of making a three-ply composite metal strip, comprising simultaneously feeding two spaced strips of stainless steel and an intermediate strip of carbon steel in the same direction in superimposed spaced relation, plating the inner sides of the traveling stainless steel strips with iron, then bringing the three strips together and flattening them, welding the edges of the traveling strips together to form a composite strip, heating the composite strip to a pressure welding temperature, and rolling the hot composite strip under sufficient pressure to weld its component strips together throughout their width.

References Cited in the file of this patent

UNITED STATES PATENTS

| | | |
|---|---|---|
| 1,896,411 | Maskrey | Feb. 7, 1933 |
| 2,331,937 | Schreiner | Oct. 19, 1943 |
| 2,539,246 | Hensel | Jan. 23, 1951 |
| 2,666,833 | Mott | Jan. 19, 1954 |